United States Patent [19]

Suzuki et al.

[11] Patent Number: 5,067,056

[45] Date of Patent: Nov. 19, 1991

[54] VEHICULAR HEADLAMP

[75] Inventors: Takanori Suzuki; Yoshio Suzuki, both of Shizuoka, Japan

[73] Assignee: Koito Manufacturing Co., Ltd., Tokyo, Japan

[21] Appl. No.: 694,716

[22] Filed: May 2, 1991

[30] Foreign Application Priority Data

May 23, 1990 [JP] Japan ............................. 2-131354

[51] Int. Cl.⁵ ............................................. B60Q 1/06
[52] U.S. Cl. ....................................... 362/66; 362/273; 362/284; 362/289; 362/324; 362/419
[58] Field of Search ....................... 362/61, 66, 80, 269, 362/273, 275, 283, 284, 319, 324, 419, 421, 428, 287, 289; 33/288

[56] References Cited

U.S. PATENT DOCUMENTS

| | | | |
|---|---|---|---|
| 4,628,414 | 12/1986 | Ricard | 362/61 |
| 4,722,033 | 1/1988 | VanDuyn et al. | 362/419 X |
| 4,802,067 | 1/1989 | Ryder et al. | 33/288 X |
| 4,922,387 | 5/1990 | Ryder et al. | 362/61 |

Primary Examiner—Stephen F. Husar
Attorney, Agent, or Firm—Sughrue, Mion, Zinn, Macpeak & Seas

[57] ABSTRACT

A vehicular headlamp in which the degree of freedom in the arrangement of the two aiming points and the pivot point is large. An inclination member with a light reflecting surface which establishes an axis of irradiation of the headlamp is supported at one pivot point fixed in position with respect to a reference member and two aiming points which are engaged with two aiming screws supported by the reference member in such a manner that the distances of the two aiming points from the reference member are adjusted by turning the respective aiming screws. The one pivot point and two aiming points are positioned at the vertices of a triangle which has one side which is horizontal as viewed from the front, and the inclination member is swung about an inclination axis passing through the pivot point by turning the two aiming screws, so that the direction of the axis of irradiation of the lamp is adjusted.

10 Claims, 7 Drawing Sheets

VEHICULAR HEADLAMP

BACKGROUND OF THE INVENTION

The present invention relates to a headlamp for a motor vehicle having an inclination detector for detecting whether or not the angle of irradiation of the headlamp is correct in a horizontal plane, and more particularly to a vehicular headlamp in which, when the angle of irradiation is not correct, it can be adjusted with ease.

An example of a vehicular headlamp aiming mechanism is disclosed, for instance, in coassigned U.S. patent application Ser. No. 07/370,949. A conventional aiming mechanism of this type will be described with reference to a movable reflector type headlamp.

As shown in FIG. 8, a reflector 2 is supported on a lamp body 1 at three points, namely, at one pivot point 3 fixed to the lamp body, and two aiming points 6 and 7 which correspond to two aiming screws 4 and 5 coupled to the lamp body. The one pivot point 3 and the two aiming points 6 and 7 are positioned in such a manner that the horizontal axis Lx connecting the horizontal aiming point 6 and the pivot point 3 and the vertical axis Ly connecting the vertical aiming point 7 and the pivot point 3 are perpendicular to each other as viewed from front. That is, the pivot point 3 is at the vertex of the angle subtending the oblique side (hypotenuse) of a right triangle. By turning the aiming screws 4 and 5, the distances of the aiming points 6 and 7 from the lamp body 1 are changed so that the reflector 2 is swung about the horizontal axis Lx and the vertical axis Ly, that is, the axis of irradiation of the headlamp is swung both in a horizontal plane and in a vertical plane.

Between the lamp body 1 and the reflector 2 is provided an inclination detector 8. The inclination detector 8 is positioned so that it does not adversely affect the effective reflecting surface of the reflector 2 and so that reading of the scale of the inclination detector is not adversely affected, even when the reflector 2 pivots about the horizontal axis Lx. In addition, in order to read the scale of the inclination detector 8 with ease, the latter is positioned inside the aiming point 6 in the horizontal plane including the horizontal axis Lx.

Sometimes the vertical axis Ly may not be parallel to the vertical line. In this case, the pivot point and the aiming points do not define a right triangle; however, the pivot point is at the vertex of the angle subtending the oblique side of the triangle.

Moreover, sometimes it is impossible to place the pivot point 3 at the vertex of the angle subtending the oblique side of the right triangle because of the configuration of the lamp body 1 or the reflector. Hence, with the above-described conventional three-point arrangement, the lamp body is unavoidably bulky, and accordingly the headlamp is unavoidably bulky.

The inventor has conducted intensive research on the above problem and found that the inclination of the reflector in the horizontal plane can be properly adjusted even when the pivot point is placed at other than the vertex of the angle subtending the oblique side of the right triangle defined by the pivot point and the aiming points. The invention is based on this finding.

SUMMARY OF THE INVENTION

An object of the invention is to provide a vehicular headlamp in which the degree of freedom in the arrangement of the two aiming points and the pivot point is large.

The foregoing and other objects of the invention have been achieved by the provision of a vehicular headlamp in which an inclination member with a light reflecting surface which establishes an axis of irradiation of the lamp is supported at one pivot point which is fixed in position with respect to a reference member and two aiming points which are engaged with two aiming screws supported by the reference member in such a manner that the distances of the two aiming points from the reference member are adjusted by turning the respective aiming screws, the one pivot point and two aiming points being positioned at the vertices of a triangle which has one side which is horizontal as viewed from the front, and the inclination member is swung about an inclination axis passing through the pivot point by turning the two aiming screws, so that the direction of the axis of irradiation of the lamp is adjusted. According to the invention, the pivot point is positioned at one of the vertices of the triangle other than the vertex subtending the oblique side thereof, one of the aiming points which is moved away from the pivot point in a vertical direction is employed as a vertical aiming point, while the other, which is moved away from the pivot point in a horizontal plane, is employed as a horizontal aiming point. An inclination detector for detecting an amount of inclination of the inclination member in a horizontal plane is provided between the reference member and the inclination member and in the horizontal plane including the pivot point as viewed from front.

In one embodiment of the inventive vehicular headlamp, the reference member is a lamp body and the inclination member is a reflector which is inclinably mounted within the lamp body.

In another embodiment of the inventive vehicular headlamp, the reference member is a lamp housing, and the inclination member is a lamp body and reflector unit having a reflector formed on the inner surface thereof.

Even in the case where the pivot point is positioned at one of the vertices of the right triangle other than the vertex subtending the oblique side, the amount of movement of the horizontal aiming point is proportional to the amount of inclination of the inclination member in the horizontal plane. Hence, by adjusting the movement of the horizontal aiming point, the direction of the axis of irradiation of the lamp in the horizontal plane, that is, the angle of irradiation of the headlamp in the horizontal plane, can be adjusted.

DESCRIPTION OF THE PREFERRED EMBODIMENTS

Figure 1:
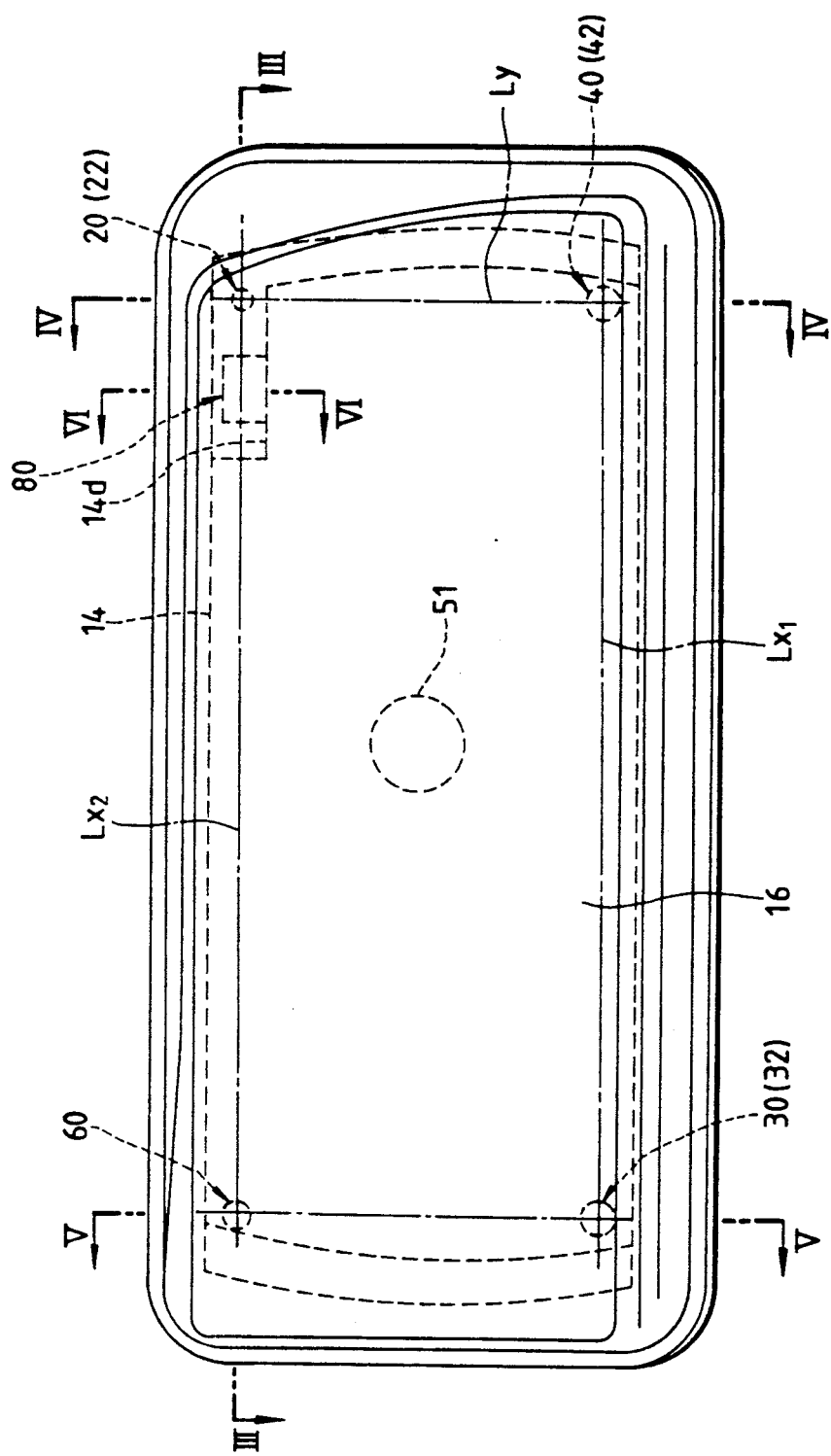
FIGS. 1 and 2 are respectively a front view and a plan view of a movable reflector type headlamp incorporating an aiming mechanism constructed in accordance with a first embodiment of the invention.
Figure 2:
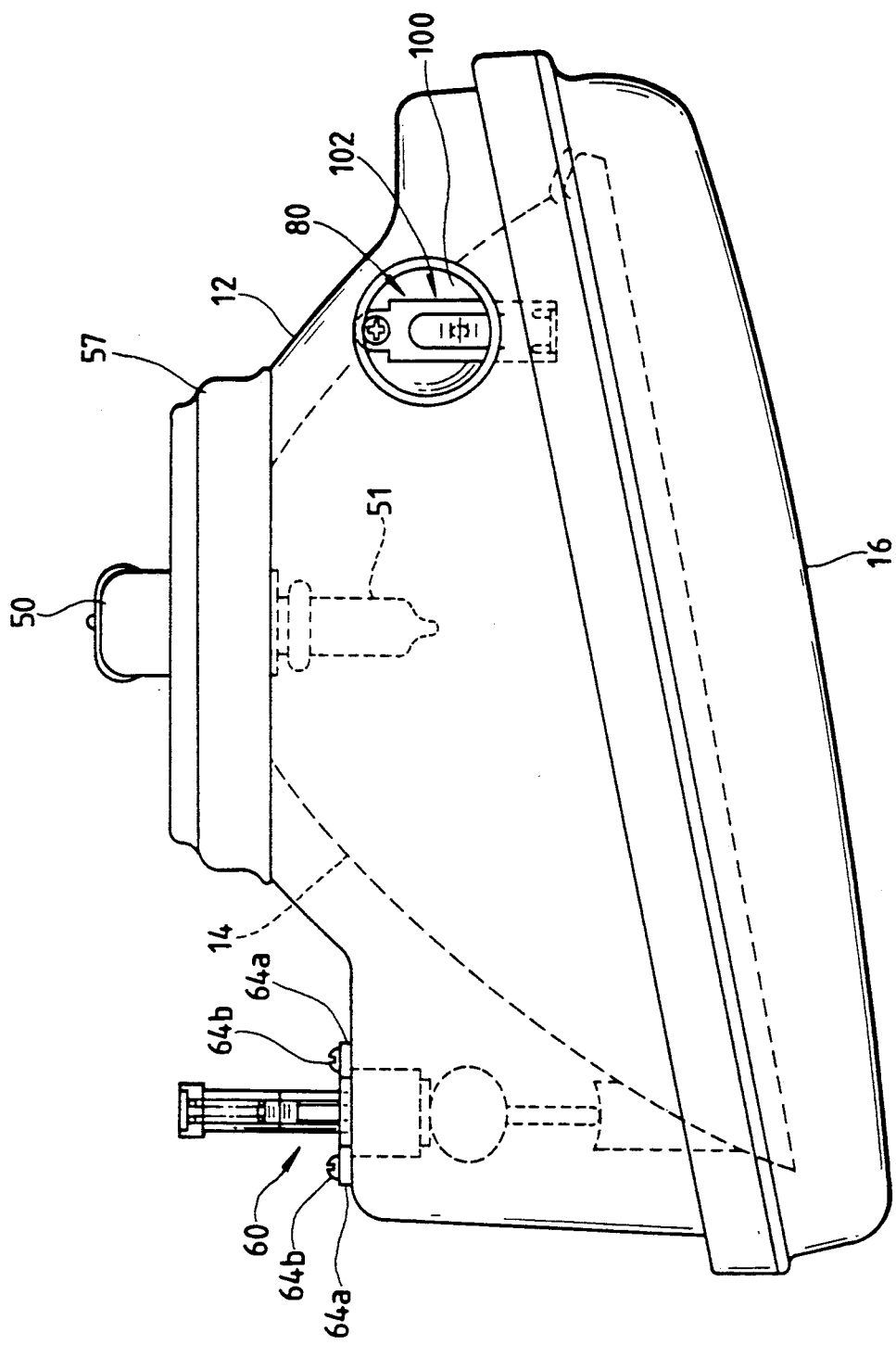
Figure 3:
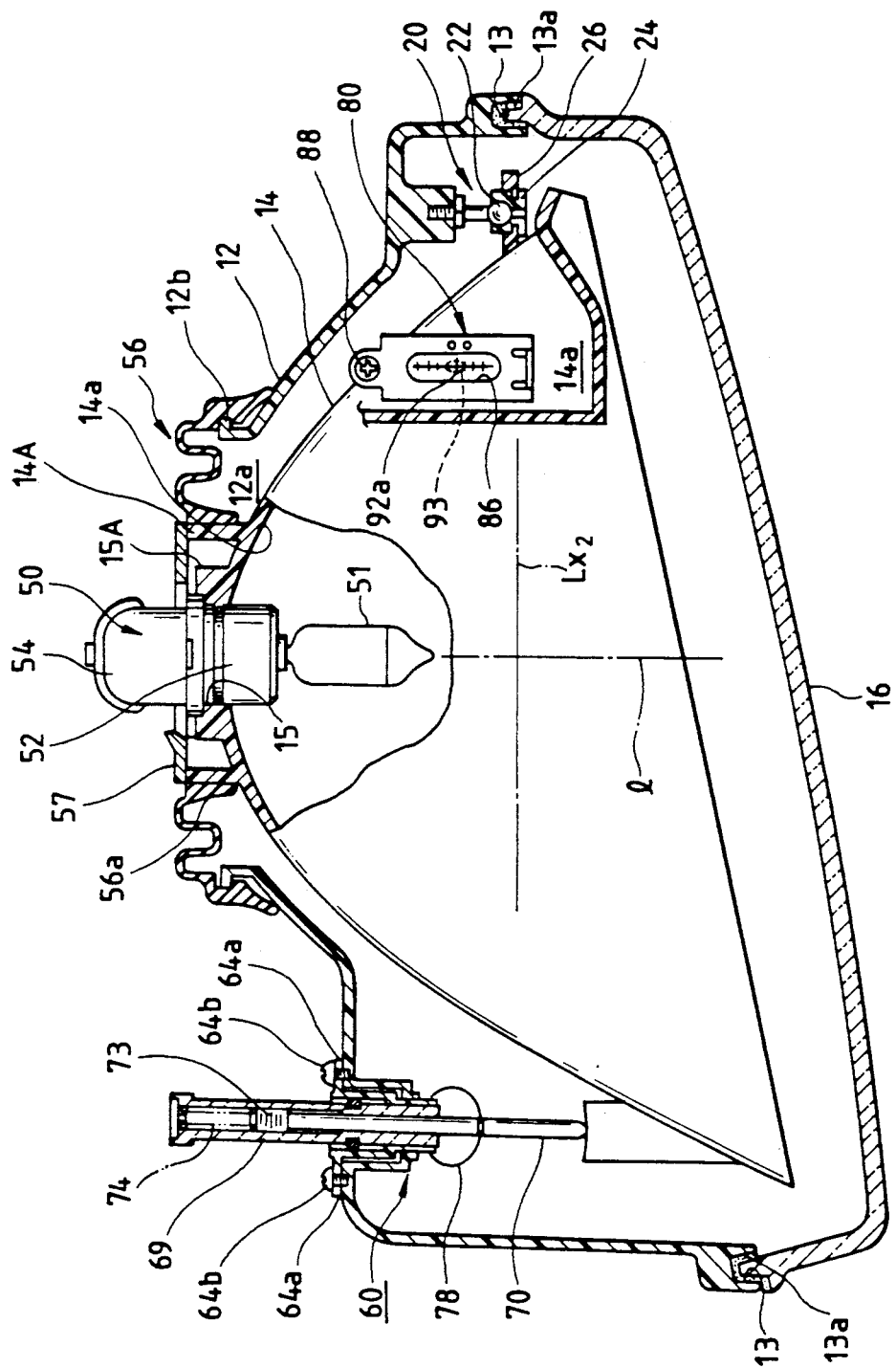
FIG. 3 is a horizontal sectional view, taken along line III—III in FIG. 1, with parts cut away.
Figure 4:
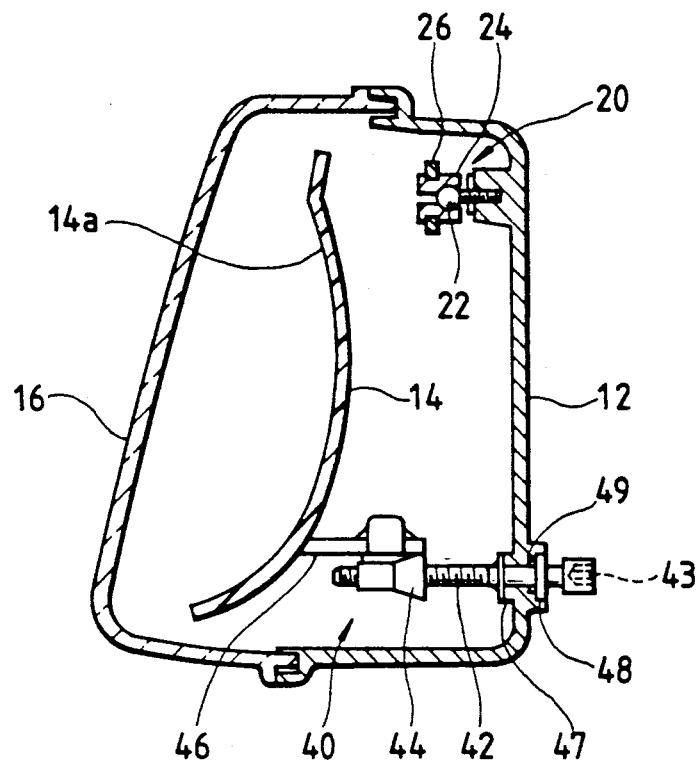
FIG. 4 is a sectional view taken along line IV—IV in FIG. 1.
Figure 6:
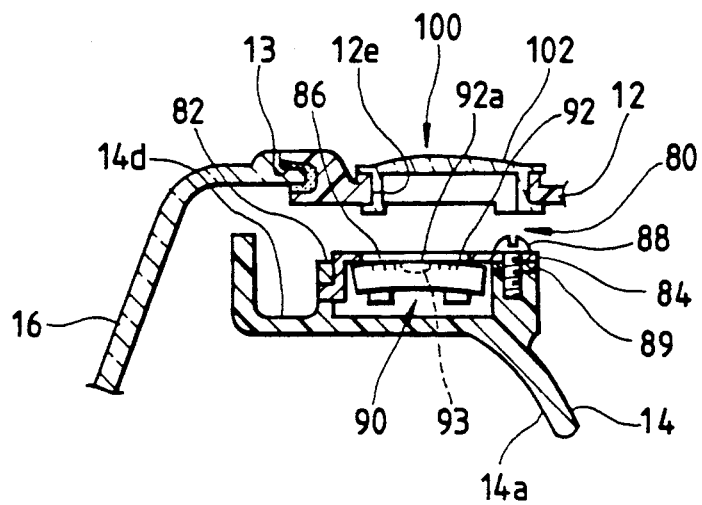
FIG. 6 is a sectional view taken along line VI—VI in FIG. 1.
Figure 5:
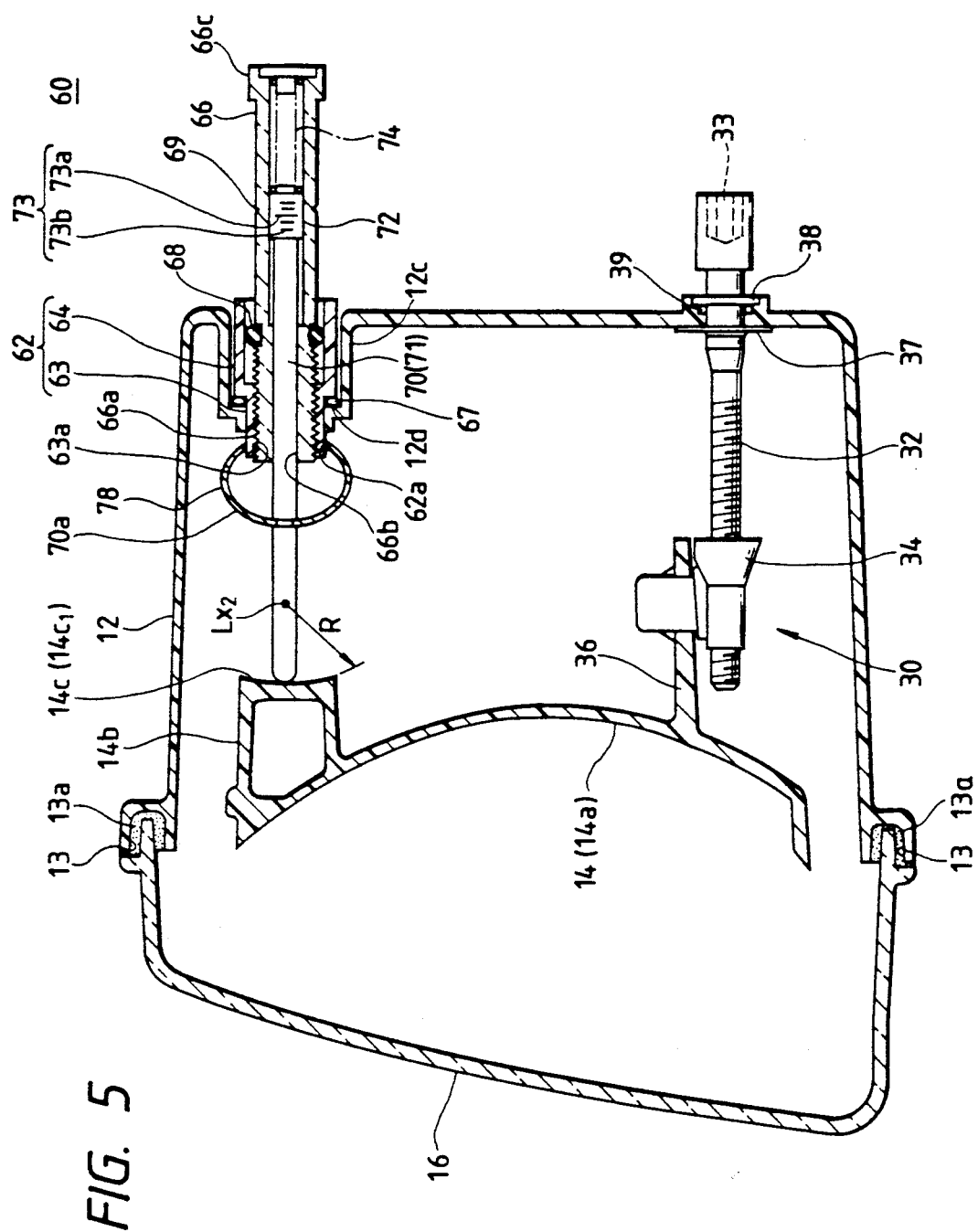
FIG. 5 is an enlarged sectional view taken along line V—V in FIG. 1.

Preferred embodiments of the invention will be described with reference to the accompanying drawings:

FIGS. 1 through 6 show an example of a movable reflector type vehicular headlamp in which the lamp body serves as a reference member and the reflector as an inclination member, which headlamp is constructed in accordance with a first embodiment of the invention. More specifically, FIGS. 1 and 2 are respectively a front view and a plan view of the movable reflector type headlamp incorporating an aiming mechanism. FIG. 3 is a horizontal sectional view, with parts cut away, showing the headlamp of FIG. 1, which is a sectional view taken along line III—III in FIG. 1. FIG. 4 is a sectional view taken along line IV—IV in FIG. 1. FIG. 5 is an enlarged sectional view taken along line V—V in FIG. 1. FIG. 6 is a sectional view taken along line VI—VI in FIG. 1.

In these figures, reference numeral 12 designates a container-like lamp body. A reflector 14 carrying a light bulb 51 is mounted in the lamp body 12. The lamp body 12 has a rectangular front opening which is covered with a front lens 16. An aluminum layer is formed on the inner surface of the reflector 14 by vacuum deposition, thus providing a parabolic light reflecting surface 14a which determines the axis of irradiation 1 of the lamp. Reference numeral 13 designates a sealing groove formed in the peripheral portion of the front opening of the lamp body 12. The leg of the front lens 16 is engaged with the sealing groove 13 through a sealing agent 13a.

As shown in FIG. 1, the reflector 14 is supported on three points, i.e., one pivot point 20, a vertical and horizontal aiming point 30, and a horizontal aiming point 40, which correspond to three vertices of a right triangle as viewed from front. The pivot point 20 is of a ball joint structure wherein a ball 22 supported on the lamp body is engaged with a socket 24 provided for the reflector 14. That is, the pivot point 20 is fixedly positioned with respect to the lamp body 12. With respect to the aiming point 30, a nut 34 provided on the side of the reflector 14 is engaged with a vertical and horizontal aiming screw 32 which is rotatably supported by the lamp body 12. Similarly, with respect to the aiming point 40, a nut 44 provided on the side of the reflector 14 is engaged with an vertical aiming screw 42 which is rotatably supported by the lamp body 12. By turning the aiming screws 32 and 42, the nuts 34 and 44 are moved along the aiming screws 32 and 42 forwardly or rearwardly, so that the distances of the aiming points 30 and 40 from the lamp body 12 are changed. The socket 24 supporting the ball 22 is fixedly secured to a bracket 26 which protrudes behind the reflector 14. The nuts 34 and 44 engaged with the aiming screws 32 and 42 are supported by brackets 36 and 46, respectively, which protrude from the rear surface of the reflector 14. References numerals 37 and 47 designate snap rings which cooperate with the flanges 38 and 48 of the aiming screws 32 and 42 to support the aiming screws 32 and 42, respectively, on the rear wall of the lamp body. Reference numerals 39 and 49 designate O-rings for sealingly holding corresponding ones of the aiming screws, and 33 and 43 indicate screwdriver engaging recesses formed in the end portions of the aiming screws 32 and 42, respectively.

The vertical aiming point 40 (which is the connecting point of the aiming screw 42 and the nut 44) is on a vertical axis Ly which is perpendicular to the axis of irradiation 1 of the lamp and passes through the pivot point 20. The vertical and horizontal aiming point (which is the connecting point of the aiming screw 32 and the nut 34) is on a horizontal axis $Lx_1$ which is perpendicular to the axis of irradiation 1 of the lamp and passes through the aiming point 40. Hence, by turning the vertical aiming screw 32, the reflector 14 is swung about the vertical axis Ly, that is, the inclination of the reflector 14 in a horizontal plane, namely, the angle of irradiation of the headlamp in a horizontal plane, can be adjusted by turning the aiming screw 32. By turning both the aiming screws 32 and 42, the reflector 14 is swung about a phantom inclination axis (or phantom horizontal axis) $Lx_2$, that is, the inclination of the reflector 14 in a vertical plane, namely, the angle of irradiation of the headlamp in a vertical plane, can be adjusted. In other words, by turning the two aiming screws 32 and 42, the reflector 14 is swung about the phantom inclination axis $Lx_2$ (i.e., the horizontal axis which is perpendicular to the axis of irradiation 1 and passes through the pivot point 20). In this manner, the inclination of the reflector, and accordingly the angle of irradiation of the headlamp, can be adjusted as desired by turning the two aiming screws 32 and 42.

In FIG. 3, reference numeral 50 designates a bulb socket with which a bulb 51 is engaged. The lamp body 12 has an opening 12a in the rear end portion thereof in which the bulb socket is detachably fitted. The bulb socket 50 is inserted into the opening 12a and fitted in a socket hole 15 which is formed in the rear end portion of the reflector 14. The socket hole 15 is surrounded by a protruding annular wall 15A formed on the rear end portion of the reflector 14, and the protruding annular wall 15A is also surrounded by a Cylindrical rearward protrusion 14A extending from the reflector 14.

A rubber cover 56 is provided between the rearward protrusion 14A and the periphery 12b of the lamp body opening 12a in such a manner as to close the lamp body opening 12a. The inner periphery 56a of the rubber cove 56 is in close contact with the outer wall of the rearward protrusion 14A of the reflector 14, that is, the rubber cover 56 is sealingly connected to the rearward protrusion 14A.

Further in FIG. 3, reference numeral 52 designates a base to which the bulb 51 is connected; 54, an L-shaped connector having an internal connecting terminal; and 57, a socket fixture which is threadedly engaged with the protruding wall 14A to fixedly fit the bulb socket 50 in the socket hole 15 formed in the lamp body.

Reference numeral 60 designates a first inclination detector disposed between the lamp body 12 and the reflector 14 in the horizontal plane including the phantom horizontal axis $Lx_2$, as shown best in FIG. 5. The first inclination detector 60 detects an amount of inclination of the reflector in a horizontal plane. The first inclination detector 60 includes a cylindrical stationary holder 62 which extends in a front-to-rear direction, the stationary holder 62 being engaged with a cylindrical protrusion 12c which extends inwardly from the rear wall of the lamp body 12; a cylindrical movable holder 66 which is threadedly engaged with the stationary holder 61 in such a manner that it extends in the front-to-rear direction of the lamp; a rod-shaped slider 70 which is slidably received in the movable holder 66; and a compression coil spring 74 disposed inside the movable holder 66 to urge the slider 70 outwardly of the movable holder 66 through the end opening 66b of the latter.

The stationary holder 62, which has the form of a stepped sleeve, has a small diameter front half 63 and a large diameter rear half 64. The stationary holder 61 is combined with the cylindrical protrusion 12c in such a manner that the step of the stationary holder 62 is engaged with the step 12d of the cylindrical protrusion 12c and the small diameter front half 63 is inserted into the cylindrical protrusion 12c. The large diameter rear half 64 has a flange 64a at the rear end, as shown in FIGS. 2 and 3, which is fixedly secured to the rear wall of the lamp body 12 with screws 64b. An O-ring 67 is interposed between the step 12d of the cylindrical protrusion 12c and the step of the stationary holder 64 so that the stationary holder 64 is sealingly engaged with the cylindrical protrusion 12c. That is, the O-ring 67 prevents the entrance of water or dust into the lamp body.

The movable holder 66 is made of transparent synthetic resin. A male thread 66a is formed on the front end portion of the movable holder 66, while a female thread 63a is formed on the small diameter front half 63 of the stationary holder 62. The movable holder 66 is threadedly engaged with the stationary holder 62 through the male thread 66a and the female thread 63a in such a manner that the movable holder 66 protrudes rearwardly from the rear wall of the lamp body. The movable holder 66 has the form of a bottomed cylinder. That is, the movable holder 66 has the opening 66b at the front end through which the slider 70 protrudes, as described above. The rear end portion 66c of the movable holder 66 is hexagonal in section so that the movable holder 66 can be turned with ease.

An annular bushing 68 is mounted on the movable holder 66 so that the movable holder 66 is sealingly engaged with the stationary holder 62. That is, the bushing 68 prevents the entrance of water and dust into the lamp body 12 through the threadedly engaged portions of the movable holder 66 and the stationary holder 62. A rubber boot 78 is placed on the front half of the stationary holder 62 and the slider 70. The rubber boot 78 is a flexible and elastic member which is open at both ends. The two openings are elastically engaged with a groove 62a formed in the front half 63 of the holder 62 and a groove 70a formed in the slider 70. The rubber boot 70 also prevents the entrance of water and dust into the lamp body through the threadedly engaged portions of the movable holder 66 and the stationary holder 62.

The stepped slider 70 fitted in the movable holder 66 is urged forwardly by the elastic force of a compression coil spring 74 so that its front end is pushed against a vertical wall 14c of a bracket 14b which protrudes from the rear wall of the reflector 14. The slider 70 is slid in the movable holder 66 forwardly or backwardly as the reflector 14 pivots about the vertical axis Ly. The slider 70 has a large-diameter rear end portion 72 on which a scale 73 is provided, while the movable holder 66 has a reference line 69 for the scale 73. More specifically, the central one of the graduation lines of the scale 73 is red, and the remaining are blue.

In advance, the reference line 69 is set in alignment with the red central graduation line 73a (which procedure is hereinafter referred to as "a zero point adjustment" when applicable), so that the degree of inclination of the reflector 14 can be read from the amount of shift of the reference line from the central graduation line. As shown in FIG. 5, the bracket 14b of the reflector 14 has a surface $14c_1$ against which the end of the slider 70 is abutted (hereinafter referred to as "an abutment surface $14c_1$" when applicable). The abutment surface is a curved surface with a radius R whose center is on the phantom horizontal line $Lx_2$. Hence, when the reflector 14 pivots vertically (i.e., when it pivots about the phantom horizontal axis $Lx_2$), the position of the slider 70 is maintained unchanged. In other words, when the reflector 14 is swung in the above-described manner, the reading on the scale of the first inclination detector 60 is maintained unchanged. With respect to the inclination detector 60 installed on the lamp body, the reference line 69 on the movable holder 66 and the scale 73 on the slider 70 are positioned behind the rear wall of the lamp body, and therefore the scale 73 can be easily read from above.

The zero point adjustment of the scale is carried out with the movable holder 66 by turning the movable holder 66, so that the movable holder 66 is moved relative to the stationary holder 61 secured to the lamp body 12. In this operation, since the front end of the slider 70 is pushed against the reflector 14 by the compression coil spring 74, the movable holder 66 is moved relative to the slider 70, that is, the reference line 69 of the movable holder is moved along the scale 73 of the slider. Thus, the zero point adjustment of the scale of the inclination detector 60 can be readily achieved by turning the movable holder 66 when the inclination of the reflector in a horizontal plane is correct.

If, after the zero point adjustment, the reflector 14 is swung about the vertical axis Ly for some reason, that is, if the angle of irradiation of the headlamp in a horizontal plane is changed, the amount of inclination of the reflector 14 will be indicated as an amount of shift of the reference line 69 from the central graduation line 73a of the scale of the inclination detector 60. Therefore, the amount of shift in inclination of the reflector, and accordingly the amount of shift in the angle of irradiation of the headlamp, can be determined with ease. To correct for such shift, the inclination of the reflector 14 is adjusted by turning the aiming screw 32 until the amount of shift of the reference line from the central graduation line 73a in the inclination detector 60 is zeroed.

In FIGS. 1 through 3 and 6, reference numeral 80 designates a second inclination detector, namely, a level for detecting the inclination of the reflector 14 in a vertical plane, i.e., the inclination in the direction of irradiation of the headlamp.

A recess 14d is formed in a part of the upper wall of the reflector 14. The part of the wall which defines the recess 14d serves as a level casing 82. The casing 82 is closed with a cover 84, on the inner surface of which a linear level vial 90 is fixedly mounted. The cover 84 has an opening 86 through which the graduation lines of the level vial 90 are exposed for viewing. Reference numeral 92 designates a scale formed by the aforementioned graduation lines marked on the level vial; 92a, one of the graduation lines which corresponds to the zero point (hereinafter referred to as "a zero point graduation line 92a" when applicable); and 93, a bubble. In the casing 82, the level vial 90 is mounted so that the scale 92 extends orthogonally with respect to the horizontal axis $Lx_2$. Therefore, the inclination of the reflector 14 about the horizontal axis $Lx_2$ is indicated as an amount of shift of the bubble 93 from the zero point graduation line 92a.

Reference numeral 88 designates a zero point adjustment screw; and 89, a leaf spring. By turning the zero point adjustment screw 88, the position of the bubble in the level vial 90 can be adjusted, that is, the zero point adjustment can be achieved.

A transparent cap 102 serving as a sight window 100 is fitted in an opening 12e formed in the upper wall of the lamp body in such a manner that the opening confronts the level 80. The scale of the level can be read through the sight window 100, that is, the amount of inclination of the reflector 14 in the vertical plane can be read. The adjustment screw 88 can be turned by first removing the cap 102. Then, a screwdriver is inserted into the lamp body through the opening 12e to turn the adjustment screw.

The adjustment of the inclination detectors 60 and 80 which is carried out when the headlamp is installed on the vehicle, and the adjustment of the angle of irradiation of the headlamp will be described.

When, in the first inclination detector 60, the central graduation line 73a of the slider 70 is in alignment with the reference line 69, the light distribution of the headlamp in the horizontal plane is correct in position, and when, in the second inclination detector which is the level 80, the bubble 93 is at the zero point graduation line 92a of the linear scale 92, the light distribution of the headlamp in the vertical plane is correct in position.

When the headlamp is initially installed on the vehicle, in general the scales of the inclination detectors will not indicate correct values because of various manufacturing tolerances and errors. Therefore, it is necessary to adjust the first and second inclination detectors 60 and 80 so that their scales indicate correct values. An example of a method of adjusting these scales will be described.

In the case of the first inclination detector 60, the vehicle is set in a horizontal position, a light distribution screen is set up a predetermined distance from the headlamp, and the headlamp is turned on. Under this condition, the aiming screw 32 is turned until the headlamp light distribution is at a predetermined position on the light distribution screen in the horizontal direction (the axis of irradiation 1 of the headlamp coincides with the axis of the vehicle). However, in this case, for instance because of variations in the dimension of the lamp mount on the vehicle body, the reference line 69 may not be in alignment with the central graduation line 73a. In this case, the movable holder 66 is moved forwardly or rearwardly by turning it until the central graduation line 73a aligns with the reference line 69, that is, the zero point adjustment is carried out. Thus, when the angle of irradiation of the headlamp in the horizontal plane is correct, the first inclination detector can be adjusted so that the reference line 69 indicates the zero point graduation line (i.e., the central graduation line 73a).

In the case of the second inclination detector, that is, in the case of the level 80, the two aiming screws 32 and 42 are turned until the hot zone of the headlamp is at a predetermined position on the light distribution screen in the vertical plane. However, in this case, the bubble may not be at the zero point graduation line 92a of the scale 92, for instance, because of variations in the dimensions of the lamp mount on the vehicle. In such an instance, the zero point adjustment screw 88 is turned until the bubble 93 is at the zero point graduation line 92a of the scale 92. Thus, when the angle of irradiation of the headlamp in the vertical plane is correct, the second inclination detector, namely, the level 80, can be adjusted so that the bubble correctly indicates the zero point graduation line 92a of the scale.

Thereafter, the user may adjust the angle of irradiation of the headlamp. If the user when observing the interior of the headlamp through the sight windows 100 finds that, in the first inclination detector 60, the reference line 69 is not in alignment with the central graduation line 73a, and/or in the second inclination detector, which is the level 80, the bubble 93 is shifted from the zero point graduation line 92a, the amount of shift in the degree of inclination of the lamp body in the horizontal plane or in the vertical plane, i.e., the amount of shift in the angle of irradiation of the headlamp in the horizontal plane or in the vertical plane, can be detected from the amount of shift indicated by the first or second inclination detector. In this case, the aiming screws 32 and 42 are turned so that, in the first inclination detector 60, the reference line 69 is in alignment with the central graduation line 73a, and so that, in the second inclination detector or the level 80, the bubble 93 is at the zero point graduation line 92a of the scale. Thus, the angle of irradiation of the headlamp in the horizontal plane or in the vertical plane can be adjusted.

In the above embodiment, the inclination detector 60 is provided at a corner of the reflector which is different from the corners where the pivot point 20 and the aiming points 30 and 40 are provided. That is, in this embodiment, unlike the prior art, it is unnecessary to dispose the inclination detector in a predetermined narrow region between the aiming points. Thus, the degree of freedom in the installation of the inclination detector is increased. The decrease in effective reflection area of the reflector due to the provision of the inclination detector is not more than that which is caused when the level mounting recess 14d is formed, and therefore the provision of the inclination detector will not adversely affect the quantity of light produced by the headlamp.

Figure 7:
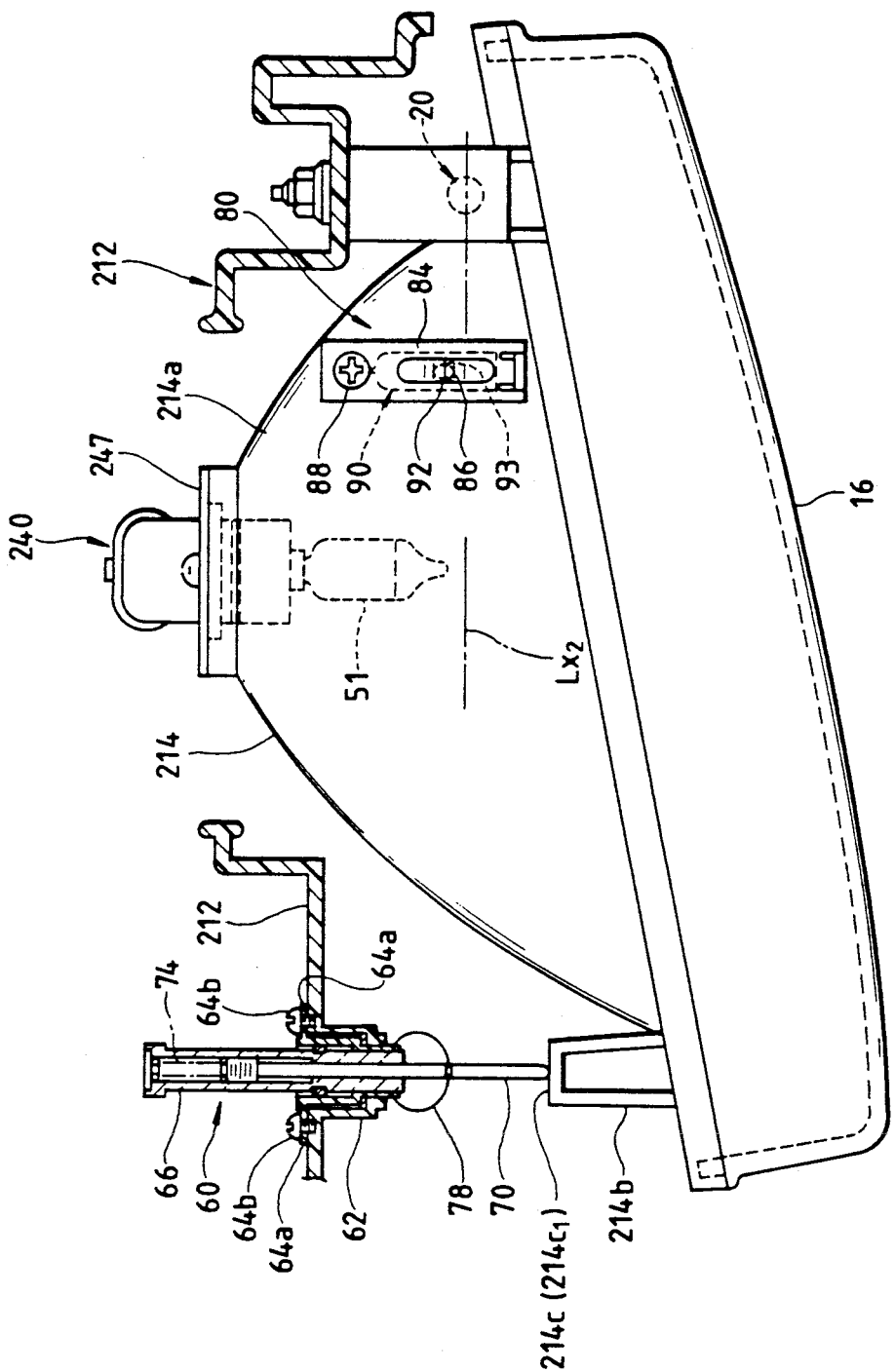
FIG. 7 is a plan view, with parts cut away, showing a movable unit type headlamp, which constitutes a third embodiment of the invention.
Figure 8:
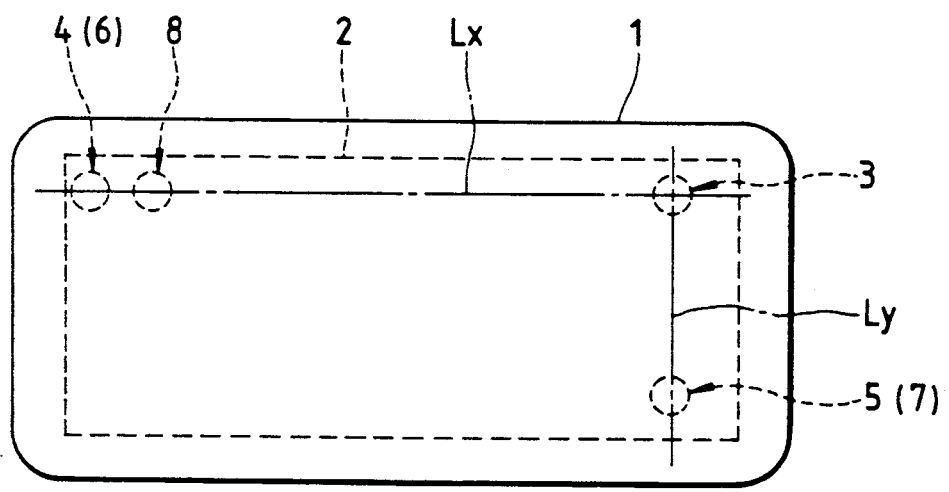
FIG. 8 is a front view showing the arrangement of an aiming mechanism in a conventional vehicular headlamp.

FIG. 7 is a plan view of a movable unit type headlamp in which the reference member is a lamp housing and the inclination member is a lamp body and reflector unit, which constitutes a third embodiment of the invention.

In the third embodiment, a lamp body and a reflector are provided as one unit 214, namely, the aforementioned lamp body and reflector unit. In the horizontal plane including a phantom horizontal axis $Lx_2$ on the upper wall 214a of the lamp body and reflector unit 214 are provided the inclination detector 60 for detecting the inclination of the lamp body and reflector unit 214 in a horizontal plane, and the inclination detector, specifically, the level 80, for detecting the inclination of the lamp body and reflector unit 214 in a vertical plane.

The stationary holder 62 of the inclination detector 60 is secured to the lamp housing 212 with screws, and the end of the slider 70 is elastically abutted against the vertical wall 214c of a bracket 214b which protrudes from the lamp body and reflector unit 214. The surface $214c_1$ of the vertical wall 214c against which the slider 70 is pushed is a curved surface, the center of curvature of which is on the phantom horizontal axis $Lx_2$. hence, the pivotal movement of the lamp body and reflector unit 214 in a vertical plane will not affect the scale reading of the inclination detector 60. The level 80 is fixedly mounted on the upper wall 214a of the lamp body and reflector unit 214. In FIG. 7, reference numeral 240 designates a bulb socket; and 247, a socket fixture for fixing the bulb socket 240 in the socket hole of the lamp body and reflector unit 214.

The other components are the same in construction and in function as those in the above-described movable reflector type headlamp, and are therefore designated by the same reference numerals or characters.

As is apparent from the above description, in the vehicular headlamp of the invention, even in the case where the pivot point is positioned at one of the vertices of the right triangle other than the vertex subtending the oblique side, the amount of movement of the horizontal aiming point is proportional to the amount of inclination of the inclination member in the horizontal plane. Hence, by adjusting the movement of the horizontal aiming point, the direction of the axis of irradiation of the lamp in the horizontal plane, that is, the angle of irradiation of the headlamp in the horizontal plane, can be adjusted. This means that the degree of freedom in the arrangement of the pivot point and the aiming points is increased accordingly, and therefore various requirements improving the compactness of a vehicular headlamp can be satisfied according to the invention.

What is claimed is:

1. A vehicular headlamp in which an inclination member with a light reflecting surface which defines an axis of irradiation of said lamp is supported on one pivot point fixed in position with respect to a reference member and two aiming points which are engaged with two aiming screws supported by said reference member in such a manner that the distances of said two aiming points from said reference member are adjusted by turning said aiming screws, said one pivot point and two aiming points being positioned at respective vertices of a triangle, one side of which is horizontal as viewed from front, and said inclination member being swung about an inclination axis passing through said pivot point by turning said two aiming screws to adjust a direction of irradiation of said lamp, the improvement wherein said pivot point is positioned at one of the vertices of said triangle other than the vertex of the angle subtending the oblique side of said triangle, one of said aiming points which is moved away from said pivot point in a vertical direction being employed as a vertical aiming point, while the other of said aiming points, which is moved away from said pivot point in a horizontal plane, is employed as a horizontal aiming point, and an inclination detector for detecting an amount of inclination of said inclination member in a horizontal plane is provided between said reference member and said inclination member, said inclination detector being mounted in a horizontal plane including said pivot point as viewed from the front of said headlamp.

2. The vehicular headlamp as in claim 1, wherein said reference member is a lamp body, and said inclination member is a reflector inclinably mounted in said lamp body.

3. The vehicular headlamp as claimed in claim 1, wherein said reference member is a lamp housing, and said inclination member is a lamp body and reflector unit comprising a reflector formed on an inner surface of said lamp housing.

4. The vehicular headlamp as claimed in claim 1, wherein said inclination detector comprises a cylindrical stationary holder extending in a front-to-rear direction of said headlamp and engaged with a cylindrical protrusion extending inwardly from a rear wall of said reference member, a cylindrical movable holder which is threadedly engaged with said stationary holder, a rod-like slider slidably received in said movable holder, and a compression coil spring disposed inside said movable holder for urging an end portion of said slider into abutment with a portion of said inclinable member.

5. The vehicular headlamp of claim 4, wherein said stationary holder has the form of a stepped sleeve having a small diameter front portion and a large diameter rear portion, a step of said stationary holder between said small and large diameter portions engaging with a step of said cylindrical protrusion, said small diameter portion being inserted in said cylindrical protrusion, and said large diameter portion having a flange at a rear end thereof fixedly secured to a rear wall of said reference member.

6. The vehicular headlamp of claim 5, wherein said movable holder is made of a transparent resin, and said movable holder is threadedly engaged with said stationary holder in such a manner that said movable holder protrudes rearwardly from a rear wall of said reference member, said movable holder having the form of a bottomed cylinder having a front opening through which said slider protrudes.

7. The vehicular headlamp of claim 6, further comprising an annular bushing mounted on said movable holder for sealingly engaging said movable holder with said stationary holder.

8. The vehicular headlamp of claim 7, further comprising a rubber boot installed on a front portion of said stationary holder and said slider for preventing entry of water and dust into said lamp body through threadedly engaged portions of said movable holder and said stationary holder.

9. The vehicular headlamp of claim 6, wherein said slider has a large diameter rear portion on which a scale is provided, a reference line for said scale being provided on said movable holder.

10. The vehicular headlamp of claim 4, further comprising a second inclination detector fixed to said movable member, said second inclination detector comprising level means.

* * * * *